United States Patent Office 3,028,821
Patented Apr. 10, 1962

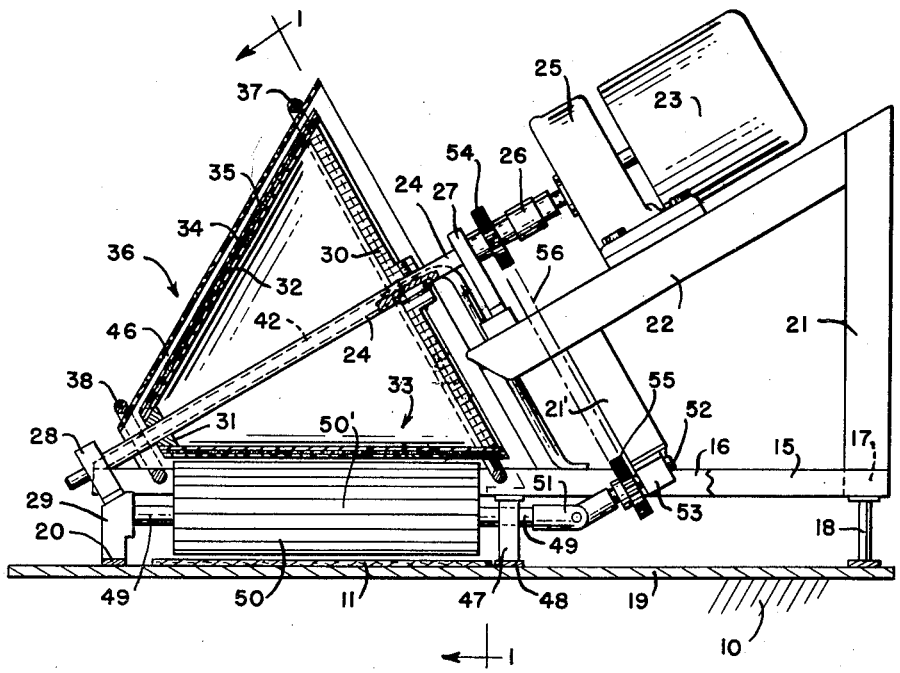

3,028,821
DOUGH TWISTER
Norman L. Petersen, Trumbull, Conn., assignor to
Chester E. Borck, Fairfield, Conn.
Filed Sept. 18, 1959, Ser. No. 840,900
7 Claims. (Cl. 107—9)

The present invention relates to apparatus for automatically imparting a twist to dough, and particularly to a new and improved dough twisting machine for making bread, Danish pastry, coffee rings and the like.

The making of Danish pastry and coffee rings requires providing a spiral twist to an elongated piece of dough, forming the twisted dough into a circle with the ends overlapped, pressing the ends together and placing the circular product onto a pan prior to baking.

Certain prior known devices for spirally twisting the dough strip require manually inserting and removing the strip of dough from between relatively rotatable, parallel arranged spaced discs which consume considerable space and require two operators, one to insert the strip of untwisted dough and another to remove the twisted strip of dough.

The principal object of this invention is to provide apparatus for automatically picking up a strip or strips of untwisted dough from a continuously or intermittently moving conveyor, automatically twisting the strip or strips of dough and automatically discharging them onto the same or another conveyor.

Another object of this invention is to provide such an apparatus that will consume a minimum of space.

Another object of this invention is to provide such an apparatus that can straddle a conveyor belt which may pass therebeneath, and from and to which belt, respectively, the strips of untwisted dough are picked up and deposited in twisted form.

Another object of this invention is to provide such an apparatus that can be adjusted to handle strips of dough of different thickness.

Another object of this invention is to provide such an apparatus that can be adjusted to provide varying degrees of twist to strips of dough.

It is usual practice in making Danish pastry, coffee rings and the like to provide a shearing device beneath which a conveyor passes, on the latter of which may be located a slab of dough of a given width and thickness. As the slab of dough passes through the shearing device, it is cut into elongated strips having a cross section that may vary, but usually is about square. The strips lie transversely of the conveyor belt and are spaced from each other a distance equal to that of the shearing blade.

In one aspect of the invention, a frame may straddle the conveyor belt and may support a rotatable, cylindrical roll arranged transversely of the conveyor and spaced above it a distance somewhat less than the thickness of the dough strips. The frame also may support a rotatable conical member arranged at such an angle that an element thereof is at all times in parallel, vertically spaced relation to an element of the cylindrical roll.

In another aspect of the invention, the conical member may have its periphery covered with a resilient material that will not adhere to the dough, and a non-rotatable conical cage-like member may surround the rotatable conical member from an entrance point on one side of the cylindrical roll to a discharge point on the opposite side of said roll. The construction is such that a conical annular space is provided between the stationary and rotatable conical members.

In still another aspect of the invention, the periphery of the cylindrical roll may be provided with axially extending grooves which pick up each piece of dough separately and feed it to the entrance point of the two conical members. Rotation of the rotatable conical member causes a rolling and twisting action to be imparted to the strip of dough as it moves from the entrance point to the discharge point of the conical members.

In still another aspect of the invention, relative adjustable movement may be provided between the two conical members along the axis of rotation of the rotatable conical member for varying the annular space between said members to thereby accommodate strips of dough of different thickness. Additionally, the hollow, stationary, conical member may be made in removable sections on the discharge side thereof so that different degrees of twist may be imparted to the strips of dough by employing all or less than all of said removable sections.

The above, other objects and novel features of the invention will become apparent from the following specification and accompanying drawing which is merely exemplary.

In the drawing:

FIG. 1 is a side elevational view of apparatus to which the principles of the invention have been applied, as viewed along line 1—1 of FIG. 2;

FIG. 2 is an enlarged sectional elevational view taken substantially along line 2—2 of FIG. 1; and FIG. 3 is a view of a strip of twisted dough after it has passed through the apparatus of FIG. 1.

Referring to the drawing, and particularly to FIG. 1, the principles of the invention are shown as applied to a dough twisting apparatus including a platform 10 along which a conveyor belt 11 is fed beneath a shearing device 12. The shearing device includes a blade (not shown) that reciprocates vertically and cuts a slab of dough 13 on the belt 11 into elongated strips of dough 14 having a substantially square cross section although the dimensions of the strip can vary within wide limits.

A framework may include parallel bars 15 and 16 joined by a cross member 17 and supported on feet elements 18 that are adapted to straddle conveyor 11 and to rest on a platform 19 along which the conveyor 11 passes.

The ends of the parallel bars 15 and 16 opposite those connected by bar 17 may be joined by a strip 20 in contact with platform 19. Uprights 21 and 21' may support an angularly disposed platform 22 on which may be mounted a motor 23 that drievs a shaft 24 through a speed reducer 25, the output of which reducer is connected to shaft 24 by a coupling 26.

The shaft 24 may be journaled in a bearing 27, fixed to platform 22, and another bearing 28 mounted on a block 29 that is fixed to strip 20. A disc 30 may be keyed to shaft 24 and a much smaller disc 31 may be connected to disc 30 by a sheet of material 32 wrapped around the peripheries of discs 30 and 31 and forming therewith a hollow conical member 33. The sheet 32 may be of any substantially rigid material, but preferably is a sheet of expanded metal on the outer surface of which may be fixed a layer of sponge rubber 34 covered with fabric such as canvas 35 or the like to provide a resilient surface for a purpose to be described later.

A non-rotatable conical member 36 may comprise a plurality of sections 36' of expanded metal or the like that are surrounded by ring members 37 and 38 at each end thereof. The sections 36' may be of the same dimension or different dimensions and they may be joined together by hinges 39 for a purpose to be described later. The combined sections 36' do not completely encircle the rotatable member 33, for a purpose hereinafter described.

Referring to FIG. 1, ears 40 may extend laterally from the ring 37 and may include yoke members 41 that may rest on inclined guide rods 42. Bars 43 may extend laterally from ring 38 and they, too, may include yoke members 44 that rest on the inclined rods 42. Locking means, shown as wing screws 45, may be provided in the yoke members 41 or 44 for fixing the yokes 41 and 44 as well as the non-rotatable, hollow, conical member 36 at adjusted points along the rods 42 to thereby provide means for varying the radial dimension of the annular space 46 between the outer peripheral surface of the rotatable member 33 and the inner peripheral surface of the non-rotatable member 36.

Referring again to FIG. 2, a bearing 47 supported on a strip 48 extending between bars 15 and 16 may be aligned with a bearing in block 29 and may journal trunnions 49 extending outwardly from and along the axial centerline of a cylindrical roll 50. The roll 50 may be located within the space formed by the ends of the sections 36' which, as previously explained, do not completely surround the rotatable member 33. The roll 50 may be spaced slightly above the conveyor 11 so that the latter may freely pass therebeneath, and its periphery may be provided with axially extending grooves 50' for a purpose to be described later. A universal joint 51 may be connected to one of the trunnions 49 and an angularly disposed shaft 52 that is journaled in a bearing 53 in a manner to have its axis of rotation parallel with the axis of shaft 24. Sprockets 54 and 55 may be fixed to shafts 24 and 52, and a chain 56 may connect said sprockets.

Referring to FIG. 1, a guide 57 following the contour of roll 50 may extend from the forward end of the sections 36' downwardly to a point above the conveyor 11 a distance slightly greater than the thickness of the strips 14. A discharge baffle 58 may be located on the side of roll 50 opposite that at which guide 57 is located for directing the twisted strips of dough 14 back onto the conveyor 11. Energizing motor 23 causes conical member 33 and roll 50 to rotate in the same direction (clockwise, FIG. 1), through the action of sprockets 54 and 55 that are joined by chain 56.

From the foregoing it is evident that as the slab 13 of dough passes beneath the shear 12, strips 14 of untwisted dough are transported by conveyor 11 to roll 50 when the grooves 50' thereon successively force each strip 14 upwardly between guide 57 and roll 50 until it is forced by the rotatable conical member 33 upwardly between the latter and the stationary conical expanded metal sections 36'. This action causes rolling of the strip 14 and because of the conical form of the members 33 and 36, the end of each strip that is rolled about the larger diameter portions of the members 33 and 36 turns more times than the end that rolls about the smaller diameter portions of members 33 and 36. This action provides the desired twist in the strip 14.

As the twisted strip 14 rolls beyond the last section 36', it engages baffle 58 causing the twisted roll 14 to drop onto the conveyor 11 where it is transported to a location for further manipulation either manually or automatically to form the twisted strip 14 into a circular Danish pastry, coffee ring or the like.

Should the thickness of the strips 14 require it, the operator may loosen the wing screws 45 and slide the member 36 along the guide rods 42 to increase or decrease the radial distance between the members 33 and 36. Additionally, should less twist be desired in the strips 14, one or more of the sections 36' may be removed by removing the pintle pins of the hinges 39 that join said sections together.

Although the various features of the new and improved dough twister have been shown and described in detail to fully disclose one embodiment of the invention, it will be evident that numerous changes may be made in such details and certain features may be used without others without departing from the principles of the invention.

What is claimed is:

1. In a dough twisting device, a frame adapted to straddle a conveyor belt; a conical member fixed to a rotatable shaft that is journaled in bearing means arranged on said frame and located such that an element of revolution of said conical member is parallel to, and transversely located closely to the belt of the conveyor; a non-rotatable hollow conical member surrounding a substantial portion of said rotatable conical member in a nesting fashion and providing an annular space between said conical members and an opening at the location of said element of revolution leading to said annular space; means for rotating said rotatable conical member; and means for feeding strips of untwisted dough having their longitudinal axes arranged transversely of said belt to the annular space between said conical members through said opening.

2. In a dough twisting device, a frame adapted to straddle a conveyor belt; a conical member fixed to a rotatable shaft that is journaled in bearing means arranged on said frame and located such that an element of revolution of said conical member is parallel to, and transversely located closely to the belt of the conveyor; a non-rotatable hollow conical member surrounding a substantial portion of said rotatable conical member in a nesting fashion and providing an annular space between said conical members and an opening at the location of said element of revolution leading to said annular space; means for rotating said rotatable conical member; means for feeding strips of untwisted dough having their longitudinal axes arranged transversely of said belt to the annular space between said conical members so that an entire longitudinal portion of each strip simultaneously engages an element of revolution of said conical members at the location of said opening; and means for moving one of said conical members axially relatively to the other to vary the radial distance between said members.

3. In a dough twisting device, a frame adapted to straddle a conveyor belt; a conical member fixed to a rotatable shaft that is journaled in bearing means arranged on said frame and located such that an element of revolution of said conical member is parallel to, and transversely located closely to the belt of the conveyor; a non-rotatable hollow conical member surrounding a substantial portion of said rotatable conical member in a nesting fashion and providing an annular space between said conical members and an opening at the location of said element of revolution leading to said annular space; means for rotating said rotatable conical member; and a rotatable roll extending transversely across said belt, located adjacent said opening and adapted to cooperate with said rotatable conical member for feeding strips of untwisted dough having their longitudinal axes arranged transversely of said belt to the annular space between said conical member so that an entire longitudinal portion of each strip simultaneously engages an element of revolution of said conical members at the location of said opening.

4. In a dough twisting device, a frame adapted to straddle a conveyor belt; a conical member fixed to a rotatable shaft that is journaled in bearing means arranged on said frame and located such that an element of revolution of said conical member is parallel to, and transversely located closely to the belt of the conveyor; a non-rotatable hollow conical member surrounding a substantial portion of said rotatable conical member in a nesting fashion and providing an annular space between said conical members and an opening at the location of said element of revolution leading to said annular space; means for rotating said rotatable conical member; and a rotatable roll having axially disposed grooves on its peripheral surface extending transversely across said belt, located adjacent said opening and adapted to cooperate with said rotatable conical member for feeding strips of untwisted dough having their longitudinal axes arranged transversely of said belt to the annular space between said conical members so that an entire longitudinal portion of each strip simultaneously engages an element of revolution of said conical members at the location of said opening.

5. In a dough twisting device, a frame adapted to straddle a conveyor belt; a conical member fixed to a rotatable shaft that is journaled in bearing means arranged on said frame at an angle such that an element of revolution of said conical member is substantially parallel to, and closely spaced from said belt straddled by said frame; a resilient outer surface fixed to said conical member; a non-rotatable hollow conical member surrounding a substantial portion of said rotatable conical member in a nesting fashion and providing an annular space between said conical members and an opening at the location of said element of revolution leading to said annular space; means for rotating said rotatable conical member; and means for feeding strips of untwisted dough having their longitudinal axes arranged transversely of said belt to the annular space between said conical members so that an entire longitudinal portion of each strip simultaneously engages an element of revolution of said conical members at the location of said opening.

6. In a dough twisting device, a frame adapted to straddle a conveyor belt; a conical member fixed to a rotatable shaft that is journaled in bearing means arranged on said frame at an angle such that an element of revolution of said conical member is substantially parallel to, and closely spaced from said belt straddled by said frame; a plurality of separable sections forming a non-rotatable hollow conical member surrounding a substantial portion of said rotatable conical member in a nesting fashion and providing an annular space between said conical members and an opening at the location of said element of revolution leading to said annular space; and means for feeding strips of untwisted dough having their longitudinal axes arranged transversely of said belt to the annular space between said conical members so that an entire longitudinal portion of each strip simultaneously engages an element of revolution of said conical members at the location of said opening.

7. In a dough twisting device, a frame adapted to straddle a conveyor belt; a conical member fixed to a rotatable shaft that is journaled in bearing means arranged on said frame at an angle such that an element of revolution of said conical member is substantially parallel to, and closely spaced from said belt conveyor straddled by said frame; a plurality of separable sections forming a non-rotatable hollow conical member surrounding a substantial portion of said rotatable conical member in a nesting fashion and providing an annular space between said conical members and an opening at the location of said element of revolution leading to said annular space; means for feeding strips of untwisted dough having their longitudinal axes arranged transversely of said belt to the annular space between said conical members so that an entire longitudinal portion of each strip simultaneously engages an element of revolution of said conical members at the location of said opening; and means for moving one of said conical members axially relatively to the other to vary the radial distance between said members.

References Cited in the file of this patent

UNITED STATES PATENTS

| | | |
|---|---|---|
| 745,018 | Kessler | Nov. 24, 1903 |
| 1,163,814 | Eckel | Dec. 14, 1915 |
| 1,461,076 | Van Houten | July 10, 1923 |
| 1,787,661 | Bloch | Jan. 6, 1931 |
| 2,132,158 | Guldbech | Oct. 4, 1938 |
| 2,259,476 | MacManus | Oct. 21, 1941 |
| 2,609,763 | Steadman | Sept. 9, 1952 |
| 2,674,209 | Anetsberger et al. | Apr. 6, 1954 |